United States Patent
He et al.

(10) Patent No.: US 11,899,663 B2
(45) Date of Patent: Feb. 13, 2024

(54) USAGE RECORD AGGREGATION

(71) Applicant: Stripe, Inc., San Francisco, CA (US)

(72) Inventors: Alisa (Shuhui) He, San Francisco, CA (US); Tushar Dhoot, Sausalito, CA (US); Ji Huang, Bothell, WA (US)

(73) Assignee: STRIPE, INC., San Francisco, CA (US)

(*) Notice: Subject to any disclaimer, the term of this patent is extended or adjusted under 35 U.S.C. 154(b) by 219 days.

(21) Appl. No.: 17/476,243

(22) Filed: Sep. 15, 2021

(65) Prior Publication Data
US 2023/0084078 A1   Mar. 16, 2023

(51) Int. Cl.
*G06F 16/245* (2019.01)
*G06F 16/24* (2019.01)
*G06F 16/2453* (2019.01)
*G06F 16/242* (2019.01)

(52) U.S. Cl.
CPC ...... *G06F 16/24539* (2019.01); *G06F 16/244* (2019.01)

(58) Field of Classification Search
None
See application file for complete search history.

(56) References Cited

U.S. PATENT DOCUMENTS

| | | | |
|---|---|---|---|
| 9,792,231 B1* | 10/2017 | Thompson | G06F 16/244 |
| 2013/0315386 A1* | 11/2013 | Stachiw | G06F 16/245 |
| 2014/0101093 A1* | 4/2014 | Lanphear | G06F 16/254 |
| | | | 707/602 |
| 2016/0140153 A1* | 5/2016 | Massarella | G06F 16/2264 |
| | | | 707/743 |
| 2017/0302551 A1* | 10/2017 | Chen | G06F 16/244 |
| 2018/0184264 A1* | 6/2018 | Dulick | G06F 16/245 |
| 2018/0276239 A1* | 9/2018 | Lin | G06F 16/122 |
| 2019/0129996 A1* | 5/2019 | Chapman | G06F 16/25 |

* cited by examiner

*Primary Examiner* — Son T Hoang
(74) *Attorney, Agent, or Firm* — Foley & Lardner LLP (57) ABSTRACT

In an example embodiment, a solution is provided that aggregates records as they are submitted to a third party (on the write path) rather than performing a real-time aggregation when a request is processed that needs the aggregation (read path). More particularly, in an example embodiment, a caching layer is introduced that avoids having to read all usage events to compute an aggregation when a request is received for aggregated data. The caching layer maintains values for various metrics that require aggregation.

20 Claims, 4 Drawing Sheets

USAGE RECORD AGGREGATION

TECHNICAL FIELD

The subject matter disclosed herein generally relates to computer records. More particularly, the subject matter disclosed herein relates to usage record aggregation.

BACKGROUND

In computing, it is common for usage records to be maintained and communicated with third parties. For example, a telecommunications company may record phone usage from their end customers and then periodically send usage reports to a third-party billing system. At the end of a billing period (e.g., month), the third-party billing system may then compute the amount to be charged to each end customer based on the submitted usage records.

As an example, an end user may have made five phone calls during the billing period, one for 3 minutes, one for 5 minutes, one for 1 minute, one for 2 minutes, and one for 9 minutes. Usage records for each call are sent to the third-party billing system from the customer servicing the user (e.g., the telecommunications company), and at the end of the billing period, the third-party billing system aggregates these usage records and determines that the end user owes $4.14 for 20 minutes of call time.

A technical issue arises when such a system is scaled up significantly. More particularly, when customers, such as the telecommunications company, submit a very large number of usage records (e.g., greater than 10,000 records) and then some event occurs where the aggregation is needed immediately e.g., the customer wishes to have a preview of the amount charged for the current period). This then requires real-time aggregation of all the usage records. Doing so causes a timeout and an error for heavy customers, as it is often not possible to perform the aggregations in real-time in a fast enough manner to service the preview request in a time faster than a timeout period for the request.

BRIEF DESCRIPTION OF THE DRAWINGS

Some embodiments are illustrated by way of example and not limitation in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, a solution is provided that aggregates records as they are submitted to a third party (on the write path) rather than perform a real-time aggregation when a request is processed that needs the aggregation (read path). This makes the writes slightly slower in some cases, but makes reads constant time.

More particularly, in an example embodiment, a caching layer is introduced that avoids having to read all usage events to compute an aggregation when a request is received for aggregated data. The caching layer maintains values for various metrics that require aggregation. Examples of such metrics may include, for a particular period, sums, medians, means, maximums, minimums, last value, modes, and ranges. Similar metrics can be computed over multiple periods, or "forever", meaning since usage data has begun to be collected. For ease of reference, any of these values will be called aggregated metrics, as they are metrics that require the aggregation of data in order to be calculated.

One additional technical issue that arises by moving aggregations into the caching layer and have them be performed when usage records are received as opposed to a later time is that occasionally a customer will send a usage record that actually corrects an earlier submitted usage record, which may cause an error in one or more of the computed aggregated values unless a more complete re-aggregation (either full or partial) is performed, while others of the computed aggregated values may be fine without a aggregation. For example, suppose a customer has previously submitted usage records indicating that user A has made 5 phone calls during the period (one for 3 minutes, one for 5 minutes, one for 1 minute, one for 2 minutes, and one for 9 minutes). Then suppose that a usage record is received indicating that the one submitted for 2 minutes should actually have been 4 minutes. If a running total for a sum metric is being kept by the caching layer, it would have initially shown a total of 20 minutes, and the new record may cause the updating of that total without the need for a re-aggregation, as the system could recognize that the third usage record is being updated to add an additional 2 minutes, and can simply add 2 minutes to the total, bringing the total to 22 minutes. If the metric, however, is a median rather than a sum, then the values for the period may need to be re-aggregated to identify the new median (or to verify that the old median is still correct). Thus, a solution that anticipates and addresses this technical issue is additionally presented.

It should be noted that the unit of measure of "usage" is not limited to time-based units, such as seconds, minutes, hours, etc., as would commonly be applied to phone call billings. Any unit of measure of usage may be utilized with the solutions provided herein, including, for example, network bandwidth used, processing cycles utilized, utility usage (e.g., gas, power, water), and the like.

Each usage record may be a self-reported record from a customer system, wherein the customer system may itself have many different users whose usage is reflected in a single usage record. For example, a telecommunications company may send a single usage record with an indication of all the minutes utilized by all of its users in the last day.

Figure 1:
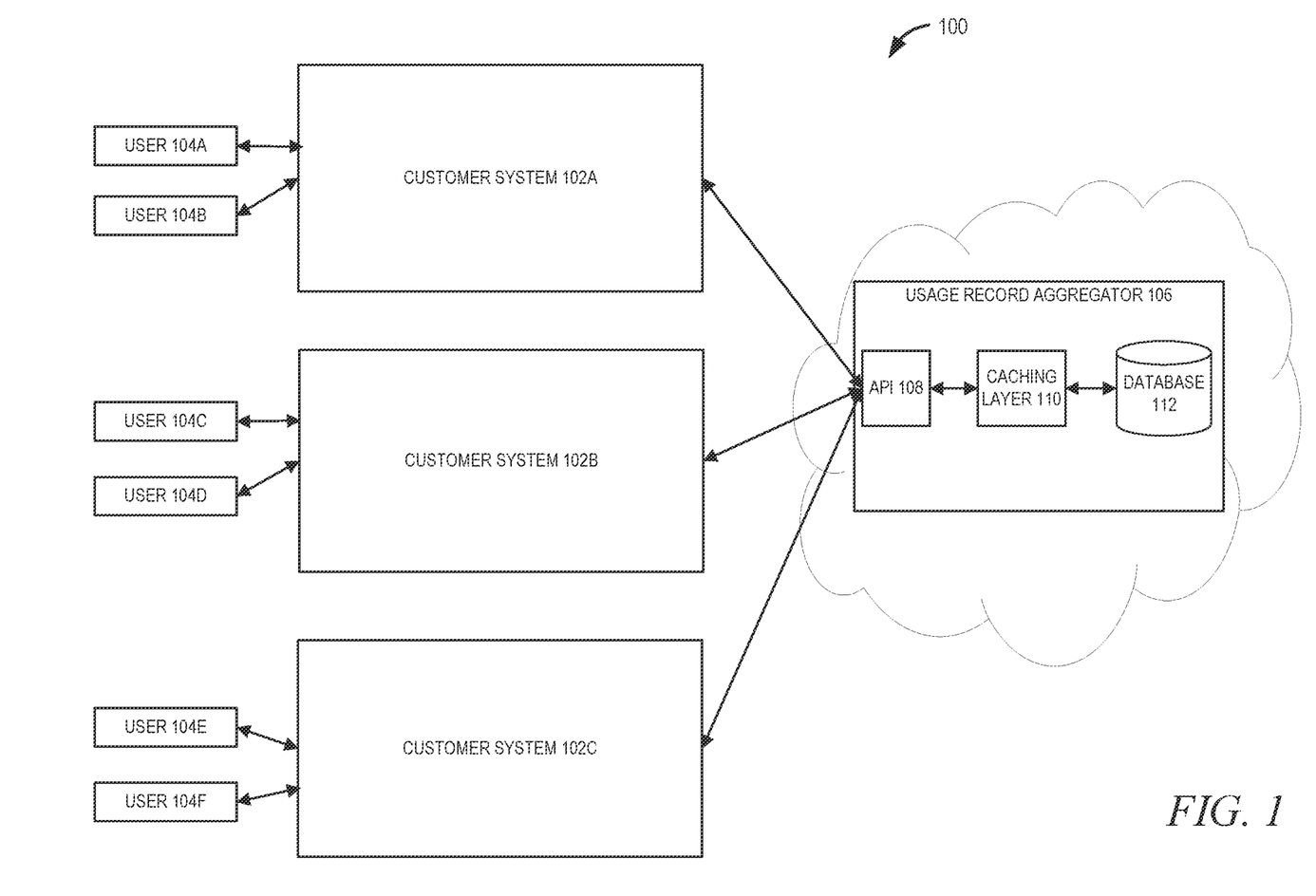
FIG. 1 is a diagram illustrating a system for aggregating usage records, in accordance with some example embodiments.

FIG. 1 is a diagram illustrating a system 100 for aggregating usage records, in accordance with an example embodiment. The system 100 includes a plurality of customer systems 102A-102C, each of which may have one or more users 104A-104F, The system also includes a usage record aggregator 106. For purposes of this document, a "customer" is an entity that captures usage information, and is not intended to be an individual person. It also should not be interpreted as limited to entities having a business relationship with the usage record aggregator 106, as in some example embodiments the subscription services provided herein to aggregate usage records may be performed for the "customer" without financial compensation, and in some example embodiments the "customer" and the usage record aggregator 106 may be the same entity.

As an example, however, each customer may be a different business entity that has subscribed to a service from the usage record aggregator 106 that provides aggregated metrics of usage records. This service may be, for example, "metered billing", where bills are automatically generated for each customer system 102A-102C indicating how corresponding user 104A-104F should be billed.

Each customer system 102A-102C may track usage information in any of a number of different ways to track usage information. The precise mechanisms each customer system 102A-102C uses to track usage information is not relevant to the present disclosure. Whatever method is used, each customer system 102A-120C occasionally sends one or more usage record to the usage record aggregator 106 via an application program interface (API) 108. These usage records may be sent individually or in batches. A caching layer 110 may then process the received usage records, which may include storing them in database 112 and maintaining one or more aggregated metrics. As will be described in more detail below, the maintaining of the one or more aggregated metrics may include aggregating the newly received usage record(s) with previously received usage record(s) in the database 112 and/or recomputing aggregated metrics based on the newly received usage record(s). These one or more aggregated metrics may themselves also be stored in the database, alongside the raw usage records. This allows the accuracy of the aggregated metrics to be compared to identify any computation issues, as well as to provide summary statistics to users upon request from the customer systems 102A-102C.

In an example embodiment, the caching layer 110 creates and maintains a new data structure, called a usage record aggregation. This usage record aggregation may include, for example, an identification, timestamps of creation and update times, an identification of an associated user, a subscription identification, and an identification of a begin and end time/date for a period. The usage record aggregation may then also include one or more aggregated metrics. Each instance of a usage record aggregation data structure may be unique to a different user, and also may be unique to a period for the user (such as a billing period). For example, user A may have a separate usage record aggregation data structure instance for period 1 than for period 2, while user B's usage record aggregation data structure instance for period 1 is different than user A's (of course, there is no requirement that each user's periods overlap exactly either—for example, user A's period may run from April $1^{st}$ to April $30^{th}$ while user B's period may run from April $4^{th}$ to May $4^{th}$).

The following is an example of a usage record aggregation data structure instance, in accordance with an example embodiment.

```
usage_record_aggregation : {
   id: "ura_123".
   created: 1578513156,
   updated: 1578513156,
   user: "acct_123",
   subscription_item: "si_123",
   period_start: 1578513156
 period_end: 1578738739 | nil
 // Cached aggregate values
   sum: 12,
   last_during_period: 123,
   last_ever: 123,
   max: 123,
 // The last usage record id that was included in this aggregation
   last_usage_record: nil | "mbur_123"
 // The timestamp of the last usage record
   max_timestamp: nil | 1578513156
 }
```

Thus, when a usage record is received from a customer, it is first determined if an instance of a usage record aggregation data structure exists for the period covered by the usage record. If not, then an instance of a usage record aggregation data structure is created for the period. Creation includes instantiating the data structure and initializing the values in the data structure. For example, the aggregated metrics may be initialized to either zero or nil, depending upon the metric (sum, for example, will be initialized to zero, while median minimum, maximum, last usage record, etc. will be initialized to nil). One exception may be aggregation metrics that are not tied to the individual period, such a "last ever", which can be initialized to the previous "last ever" metric value for this user.

In some example embodiments, it may be beneficial to establish the concept of a "current" usage record aggregation versus an earlier or later one. A current usage record aggregation is one that corresponds to a time period that has not been "closed" yet. Most of the time, when a usage record is received by the usage record aggregator 108 it is a record for usage that occurred in the current time period (e.g., a current billing period). For example, a usage record received on April $29^{th}$ will likely correspond to a billing cycle that extends from April $1^{th}$ to April $30^{th}$. That is not always the case, however. For example, it is possible that the usage record actually informs of a usage (or updates a previously sent usage record) of March $20^{th}$. Additionally, even in normal circumstances it may take a few days for usage to be reported, and thus, for example, a usage record received on May $_2^{\circ}$ d could very well be for usage that occurred during the billing cycle that extends from April $1^{st}$ to April $30^{th}$, as opposed to the billing cycle that extends from May $1^{st}$ to May $31^{th}$. One should also account for the possibility of "clock drift", where a clock maintained by the customer system 102A-102C is different than the clock maintained by the usage record aggregator 108. It is also possible for a customer to report usage in the future, such as if the customer wants to bill the user for a fixed amount of usage each month and can then report, for example, that a user will use that fixed amount of usage over a time period that might include dates in the future. To compensate for these possibilities, the current period may be "held open" for a period of time after the end date of the period, and mechanisms are put into place to match usage records with correct billing periods.

Since there may be a delay between when a usage occurs and when a record of such usage is sent to the usage record aggregator 108, a usage record aggregation may be "held open" until some point later then when the period to which it applies is over. In an example embodiment, this delay may be a preset value (e.g., 2 days). In other example embodiments, this delay may be variable and may differ based on user and/or customer industry. In yet other example embodiments, a machine learned model may be trained to learn a delay period for a particular user based on training data, which may include customer information (such as industry, size, past history of lateness of reporting usage data, etc.) and labels for the customer information (indicating, for example, an appropriate delay for the user). The machine learned model may be trained by passing the training data into a machine learning algorithm, such as logistic regression, support vector machine, naïve Bayes classifier, and neural networks, which may learn weights assigned to input features of a customer.

Nevertheless, in an example embodiment, three commands may be utilized in a subscription package. These commands may include a CreateOrUpdateUsageRecord command, a CreateUsageRecord command, and an UpdateUsageRecord command. In an example embodiment, these may be defined as follows:

CreateOrUpdateUsageRecord command.

```
usage_record = Model::UsageRecord.query_by(:recorded_for).load_one
if usage_record nil?
    CreateUsageRecord.call
else
    UpdateUsageRecord.call
```

CreateUsageRecord command:

```
#load the usage record aggregation for this subscription item
    ura =
Model::UsageRecordAggregation.query_by (:last_open_aggregation).load_one
if ur.timestamp > ura.max_timestamp:
        creating_newer_record(ura, ur)
else ur.timestamp < ura.max_timestamp:
        creating_older_record(ura, ur)
end
def creating_newer_record(ura:, ur:)
        ura.sum += ur.quantity
        ura.max = max (ur.quantity, self max)
        ura.last_during_period = ur.quantity
        ura.last_ever = ur.quantity
        ura.last_usage_record= ur.id #the ID of the usage record that caused this update)
        ura.max_timestamp = ur.timestamp
end
# we don't need to update other aggregations here because the usage record that
# being created is not the last/newest one
def creating_older_record(ura:, ur:)
        ura.sum += ur.quantity
        ura.max = max (ur.quantity, self max)
end
```

UpdateUsageRecord command:

```
ura = Model::UsageRecordAggregation.query_by(last_open_aggregation).load_one
    if action == MethodParams: Action,set
        delta = params.quantity – ur.quantity
        new_quantity = params.quantity
        update_usage_record_aggregation(ur, ura, delta, new_quantity)
    else
        delta = params, quantity
        new_quantity = params, quantity + ur.quantity
        update_usage_record_aggregation(ur, ura, delta, new_quantity)
    end
    mutator.quantity = new_quantity
end
def update_usage_record_aggregation(ur, ura, delta, new_quantity)
    ura.sum += delta
    if ur.id == ura.last_usage_record
        ura.last_during_period = new_quantity
        ura.last_ever = new_quantity
    end
    if ur.quantity == ura.max && delta < 0 #it is being set to a lower value
        #run the query to find the new max among all usage records except
        #the updating ur
        new_max = find_new_max(ur)
        ura.max = new_max
    else
        ura.max = max(new_quantity, ura.max)
    end
end
```

When a call is made that queries a current usage aggregation metric, all that needs to happen is that the corresponding URA model along with the corresponding aggregation field (i.e., the aggregation metric, such as sum, max, etc.) is looked up. This retrieval will be on the order of (1) time, compared to the prior technique of querying all the usage records and performing the aggregation at query time.

When a subscription cycles (the period's aggregations are closed), the subscription item's current URA may be finalized by setting its period_end value to the concatenation of the period's end in the subscription and the usage cutoff time (delay). Then the period_start field can be set to the current URA's finalization time for the URA that is awaiting cycling (if one was created due to past receipt of usage records for the new period).

Nevertheless, even when a URA is "finalized" it may still be possible to edit the values in it, for example if a customer sends a usage record that corrects a value in an already finalized URA.

Furthermore, in an example embodiment, logic may be implemented to determine which period a usage record may impact. In some example cases, it is possible for a single usage record to impact multiple URAs, such as if a correction to a past usage record also corrects the date(s) to which the past usage record applies, so that the corrected date(s) are in a different period than the uncorrected date(s). Thus, for example, it is possible that an update to a usage record may require reaggregation of not just usage records within the same time period, but also usage records of any other affected time periods as well.

Figure 2:
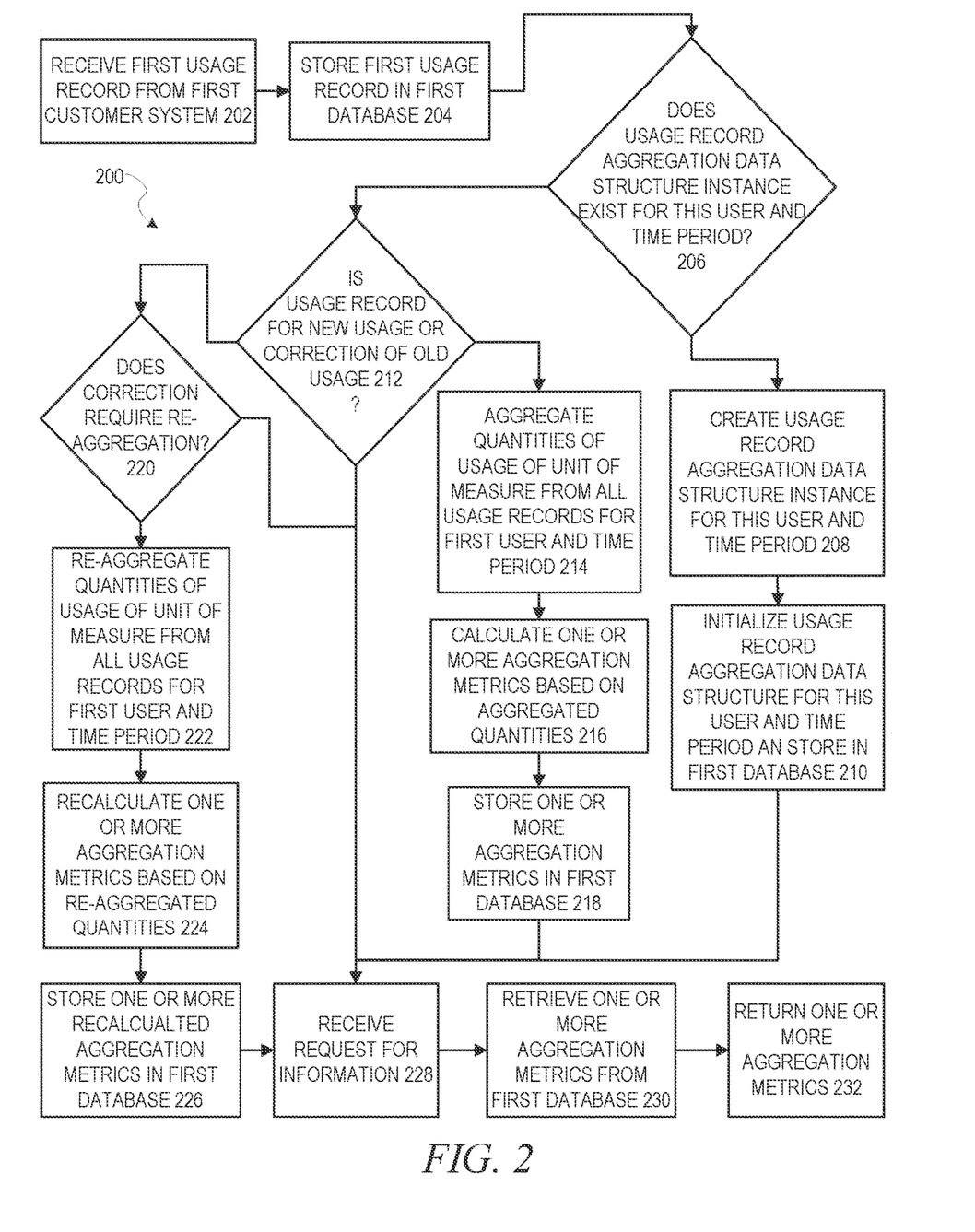
FIG. 2 is a flow diagram illustrating a method of aggregating usage records, in accordance with some example embodiments.

FIG. 2 is a flow diagram illustrating a method 200 of aggregating usage records, in accordance with an example embodiment. At operation 202, a first usage record is received from a first customer system. The first usage record indicates an identification of a first user associated with the first customer system (such as a user who uses the first customer system for some sort of service, such as telecommunications) and a quantity of usage of a first unit of measure that occurred during a first predefined time period. The first predefined time period may or may not be included in the first usage record. In some example embodiments where the first predefined time period is not included in the first usage record, it may be determined by accessing a record for the user that indicates predefined time periods and matching one of the time periods to a date or dates indicate in the first usage record.

At operation 204, the first usage record is stored in a first database. At operation 206, it is determined if a usage record aggregation data structure instance exists that uniquely corresponds to both the first user and the first predefined time period. If not, then at operation 208, a usage record aggregation data structure instance that uniquely corresponds to both the first user and the first predefined time period is created. Then, at operation 210, one or more aggregation metrics for the first user and the first predefined time period are initialized and stored in the first database.

If, however, at operation 206 it was determined that a usage record aggregation data structure instance exists that uniquely corresponds to both the first user and the first predefined time period, at operation 212, it is determined whether the usage record indicates a new usage for the first user or corrects an old usage for the first user (i.e., is a correction of a quantity in an earlier usage record). If it is a new usage, then at operation 214, quantities of usage of the first unit of measure from all usage records, in the first database, that correspond uniquely to both the first user and the first predefined time period are aggregated. Then, at operation 216, one or more aggregation metrics are calculated based on the aggregated quantities. At operation 218, the one or more aggregation metrics are stored in the first database, along with an identification of the first user and an indication of the first predefined time period.

If it was determined at operation 212 that the usage record corrects an old usage for the first user, then at operation 220, it is determined whether the correction requires re-aggregation of quantities for the first user for the first predefined time period. This may be based partially on the type of aggregation metrics involved. Some aggregations metrics (such as SUM) do not ever require re-aggregation. Other aggregation metrics (such as median) always require re-aggregation. Other aggregation metrics (such as max) may or may not require re-aggregation. In the latter case, the determination may be based on the exact values involved. For example, if a quantity value is changed from 4 to 2 and the previous max was 5, then no re-aggregation is performed because the change would not affect the aggregation metric. If, however, the previous max was 4, then re-aggregation would be performed to determine whether the max is still 4.

If it is determined that the correction requires re-aggregation of quantities for the first user for the first predefined time period, then at operation 222 quantities of usage of the first unit of measure from all usage records, in the first database, that correspond uniquely to both the first user and the first predefined time period, are re-aggregated. Then at operation 224, the one or more aggregation metrics are recalculated based on the re-aggregated quantities. Then at operation 226, the recalculated one or more aggregation metrics is stored in the first database, along with an identification of the first user and an indication of the first predefined time period At operation 228, a request for information is received from the first customer system. At operation 230, in response to the request for information, the one or more aggregation metrics are retrieved from the first database, based on a matching of the identification of the first user and a matching of the indication of the first predefined time period. At operation 232, a response to the first customer system based on the retrieved one or more aggregation metrics is returned.

Additionally, in some example embodiments, offline verification of the computed aggregation metrics may be performed, and an administrator may be alerted if the verification fails. For example, the aggregating metrics may be periodically recalculated by re-aggregating the quantities for a given user and time period and compared against the values for the aggregation metrics computed at write-time using the aforementioned processes. Even though this process of reaggregating and checking may be slow, since it is performed in an offline manner this slowness will not affect runtime result generation the same way it would if it were performed at read-time.

Figure 3:
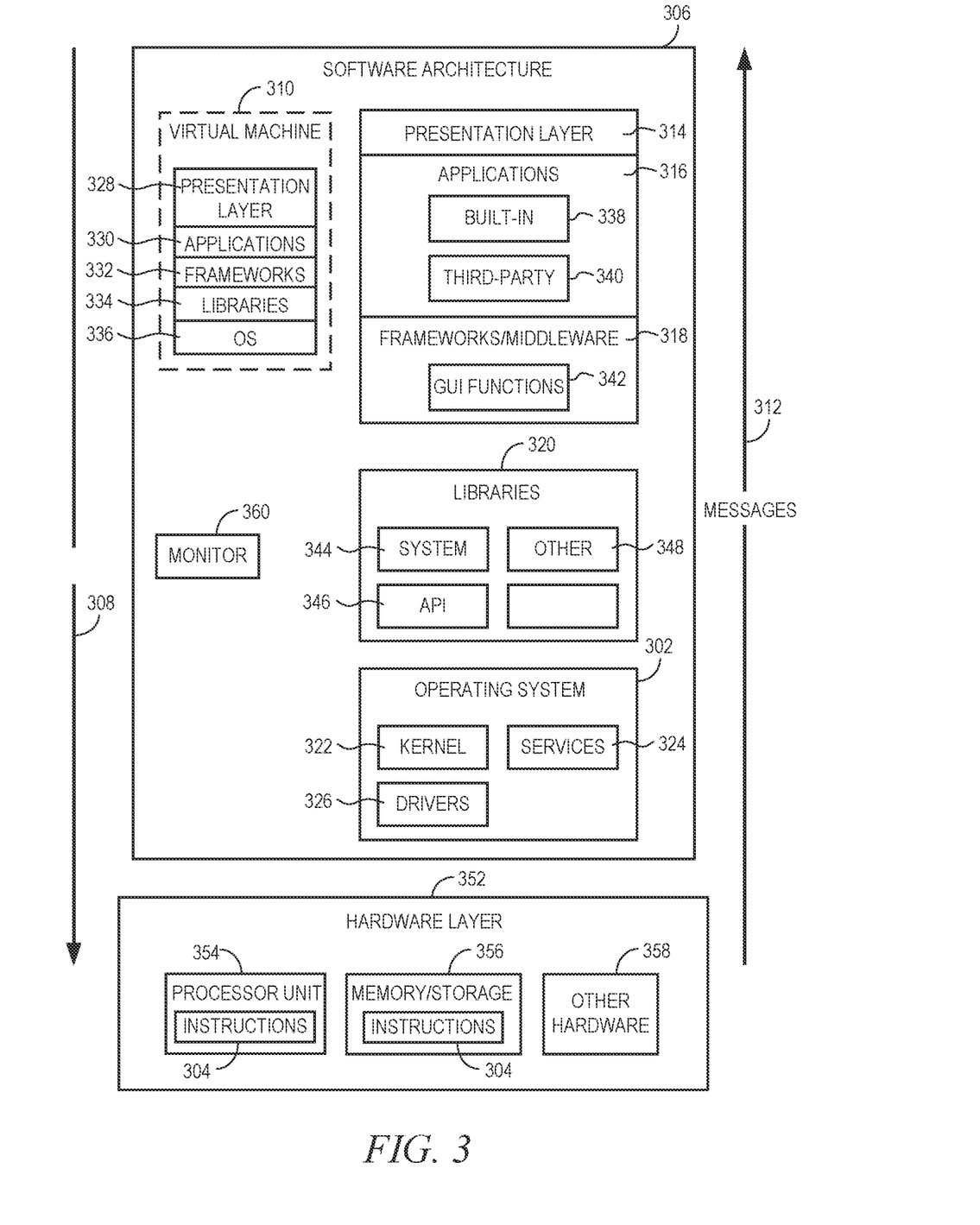
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A hardware layer 352 is illustrated and can represent, for example, the machine 400 of FIG. 4. The hardware layer 352 includes a processor 354 having associated executable instructions 304. The associated executable instructions 304 represent the executable instructions of the software architecture 306, including implementation of the methods, components, and so forth described herein. The hardware layer 352 also includes memory and/or storage modules as memory/storage 356, which also have the associated executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
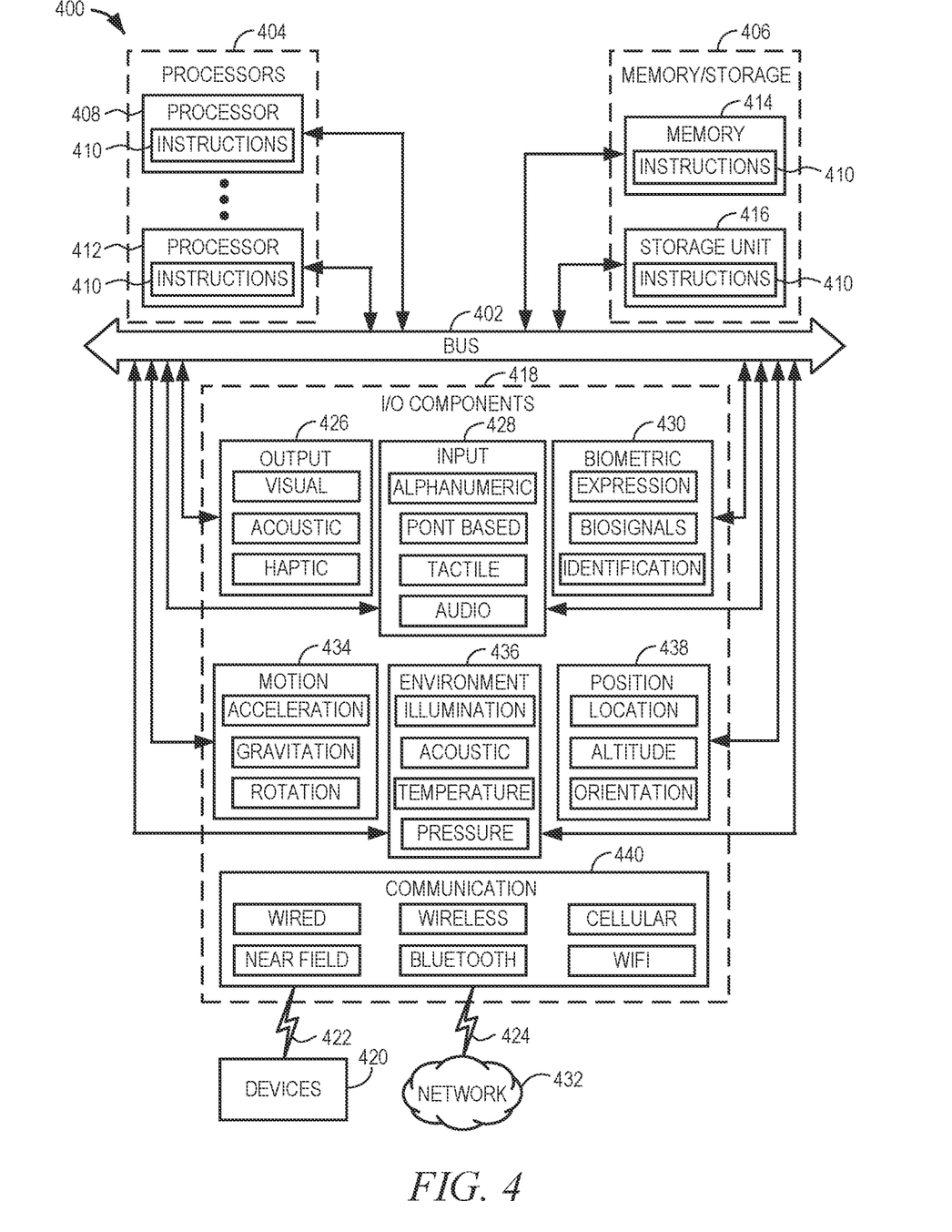
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi@ components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 6G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a machine but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2021, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   receiving, by one or more processors coupled to non-transitory memory, a first usage record from a first customer system, the first usage record indicating an identification of a first user associated with the first customer system and a quantity of usage of a first unit of measure that occurred during a first predefined time period;
   storing, by the one or more processors, the first usage record in a first database;
   determining, by the one or more processors, that a usage record aggregation data structure instance exists that uniquely corresponds to both the first user and the first predefined time period, the usage record aggregation data structure instance indicating that usage records of the first user corresponding to the first predefined time period are to be aggregated;

upon determining that the usage record aggregation data structure instance exists, aggregating, by the one or more processors, quantities of usage of the first unit of measure from all usage records, in the first database, that correspond uniquely to both the first user and the first predefined time period;

calculating, by the one or more processors, one or more aggregation metrics based on the aggregated quantities; and storing, by the one or more processors, the one or more aggregation metrics in a caching layer, along with the identification of the first user and an indication of the first predefined time period.

2. The method of claim 1, further comprising:

receiving, by the one or more processors, from the first customer system, a request for information;

in response to the request for information, retrieving, by the one or more processors, the one or more aggregation metrics from the first database, based on a matching of the identification of the first user and a matching of the indication of the first predefined time period; and returning, by the one or more processors, a response to the first customer system based on the retrieved one or more aggregation metrics.

3. The method of claim 1, further comprising:

receiving, by the one or more processors, a second usage record from the first customer system, the second usage record indicating the identification of the first user and a corrected quantity of usage of the first unit of measure, the corrected quantity of usage being a correction of a quantity of usage of another usage record already stored in the first database;

in response to the receiving of the second usage record, determining, by the one or more processors, whether the one or more aggregation metrics include an aggregation metric requiring re-aggregation when a prior usage record is updated; and in response to a determination that the one or more aggregation metrics include an aggregation metric requiring reaggregation when a prior usage record is updated, reaggregating, by the one or more processors, quantities of usage of the first unit of measure from all usage records, in the first database, that correspond uniquely to both the first user and the first predefined time period, recalculating the one or more aggregation metrics based on the reaggregated quantities, and storing the recalculated one or more aggregation metrics in the first database, along with the identification of the first user and the indication of the first predefined time period.

4. The method of claim 1, wherein the one or more aggregation metrics include a sum.

5. The method of claim 1, wherein the one or more aggregation metrics include a median.

6. The method of claim 1, wherein the one or more aggregation metrics include a last ever.

7. The method of claim 1, wherein the one or more aggregation metrics include a maximum.

8. The method of claim 1, wherein the one or more aggregation metrics include a minimum.

9. A system comprising:

one or more processors; and a non-transitory memory storing instructions that, when executed by at least one processor among the one or more processors, cause the at least one processor to perform operations comprising:

receiving a first usage record from a first customer system, the first usage record indicating an identification of a first user associated with the first customer system and a quantity of usage of a first unit of measure that occurred during a first predefined time period;

storing the first usage record in a first database;

determining that a usage record aggregation data structure instance exists that uniquely corresponds to both the first user and the first predefined time period, the usage record aggregation data structure instance indicating that usage records of the first user corresponding to the first predefined time period are to be aggregated;

upon determining that the usage record aggregation data structure instance exists, aggregating quantities of usage of the first unit of measure from all usage records, in the first database, that correspond uniquely to both the first user and the first predefined time period;

calculating one or more aggregation metrics based on the aggregated quantities; and storing the one or more aggregation metrics in a caching layer, along with the identification of the first user and an indication of the first predefined time period.

10. The system of claim 9, wherein the operations further comprise:

receiving, from the first customer system, a request for information;

in response to the request for information, retrieving the one or more aggregation metrics from the first database, based on a matching of the identification of the first user and a matching of the indication of the first predefined time period; and returning a response to the first customer system based on the retrieved one or more aggregation metrics.

11. The system of claim 9, wherein the operations further comprise:

receiving a second usage record from the first customer system, the second usage record indicating the identification of the first user and a corrected quantity of usage of the first unit of measure, the corrected quantity of usage being a correction of a quantity of usage of another usage record already stored in the first database;

in response to the receiving of the second usage record, determining whether the one or more aggregation metrics include an aggregation metric requiring re-aggregation when a prior usage record is updated; and in response to a determination that the one or more aggregation metrics include an aggregation metric requiring reaggregation when a prior usage record is updated, reaggregating quantities of usage of the first unit of measure from all usage records, in the first database, that correspond uniquely to both the first user and the first predefined time period, recalculating the one or more aggregation metrics based on the reaggregated quantities, and storing the recalculated one or more aggregation metrics in the first database, along with the identification of the first user and the indication of the first predefined time period.

12. The system of claim 9, wherein the one or more aggregation metrics include a sum.

13. The system of claim 9, wherein the one or more aggregation metrics include a median.

14. The system of claim 9, wherein the one or more aggregation metrics include a mean.

15. The system of claim 9, wherein the one or more aggregation metrics include a maximum.

16. The system of claim 9, wherein the one or more aggregation metrics include a minimum.

17. A non-transitory machine-readable medium comprising instructions which, when executed by one or more processors, cause the one or more processors to perform operations comprising:
  receiving a first usage record from a first customer system, the first usage record indicating an identification of a first user associated with the first customer system and a quantity of usage of a first unit of measure that occurred during a first predefined time period;
  storing the first usage record in a first database;
  determining that a usage record aggregation data structure instance exists that uniquely corresponds to both the first user and the first predefined time period, the usage record aggregation data structure instance indicating that usage records of the first user corresponding to the first predefined time period are to be aggregated;
  upon determining that the usage record aggregation data structure instance exists, aggregating quantities of usage of the first unit of measure from all usage records, in the first database, that correspond uniquely to both the first user and the first predefined time period;
  calculating one or more aggregation metrics based on the aggregated quantities; and
  storing the one or more aggregation metrics in a caching layer, along with the identification of the first user and an indication of the first predefined time period.

18. The non-transitory machine-readable medium of claim 17, wherein the operations further comprise:
  receiving, from the first customer system, a request for information;
  in response to the request for information, retrieving the one or more aggregation metrics from the first database, based on a matching of the identification of the first user and a matching of the indication of the first predefined time period; and
  returning a response to the first customer system based on the retrieved one or more aggregation metrics.

19. The non-transitory machine-readable medium of claim 17, wherein the operations further comprise:
  receiving a second usage record from the first customer system, the second usage record indicating the identification of the first user and a corrected quantity of usage of the first unit of measure, the corrected quantity of usage being a correction of a quantity of usage of another usage record already stored in the first database;
  in response to the receiving of the second usage record, determining whether the one or more aggregation metrics include an aggregation metric requiring re-aggregation when a prior usage record is updated; and
  in response to a determination that the one or more aggregation metrics include an aggregation metric requiring reaggregation when a prior usage record is updated, reaggregating quantities of usage of the first unit of measure from all usage records, in the first database, that correspond uniquely to both the first user and the first predefined time period, recalculating the one or more aggregation metrics based on the reaggregated quantities, and storing the recalculated one or more aggregation metrics in the first database, along with the identification of the first user and the indication of the first predefined time period.

20. The non-transitory machine-readable medium of claim 17, wherein the one or more aggregation metrics include a sum.

* * * * *